United States Patent [19]

Drake et al.

[11] 4,445,576

[45] May 1, 1984

[54] METHOD OF USING A SPACER FOR WELL CONTROL FLUID

[75] Inventors: Evelyn N. Drake, Plainfield, N.J.; Yuh-hwang Tsao, Houston, Tex.

[73] Assignees: Exxon Research and Engineering Co., Florham Park, N.J.; Exxon Production Research Company, Houston, Tex.

[21] Appl. No.: 381,226

[22] Filed: May 24, 1982

[51] Int. Cl.$^3$ ............................................. E21B 33/138
[52] U.S. Cl. ..................................... 166/291; 166/294; 175/72; 252/8.5 LC
[58] Field of Search ............... 166/291, 293, 292, 294; 175/72; 252/8.5 LC, 8.5 P

[56] References Cited

U.S. PATENT DOCUMENTS

| | | | |
|---|---|---|---|
| 3,625,286 | 12/1971 | Parker | 166/291 |
| 3,688,845 | 9/1972 | Messenger | 166/291 |
| 3,724,564 | 4/1973 | Messenger | 175/72 |
| 3,850,248 | 11/1974 | Carney | 166/291 |
| 3,876,006 | 4/1975 | Messenger | 175/72 X |
| 4,108,779 | 4/1978 | Carney | 166/291 X |
| 4,173,999 | 11/1979 | Messenger | 166/293 |
| 4,223,732 | 9/1980 | Carriay et al. | 166/291 |
| 4,233,165 | 11/1980 | Salathiel et al. | 252/8.5 P X |
| 4,359,391 | 11/1982 | Salathiel et al. | 252/8.5 P X |
| 4,397,354 | 8/1983 | Dawson et al. | 175/72 X |

FOREIGN PATENT DOCUMENTS

| | | | |
|---|---|---|---|
| WO81/00850 | 4/1981 | PCT Int'l Appl. | 166/294 |
| WO81/00851 | 4/1981 | PCT Int'l Appl. | 252/8.516 |

*Primary Examiner*—George A. Suchfield
*Attorney, Agent, or Firm*—Edward M. Corcoran

[57] ABSTRACT

A spacer comprising the water-in-oil emulsion portion of a shear-thickening well control fluid is used to separate drilling mud from the shear-thickening fluid in the drill pipe in the well bore to avoid premature thickening of the shear thickening fluid in the drill pipe. The shear-thickening well control fluid comprises a water-in-oil emulsion in which is dispersed granular particles of hydratable, water expandable clay.

28 Claims, No Drawings

METHOD OF USING A SPACER FOR WELL CONTROL FLUID

BACKGROUND OF THE INVENTION

1. Field of the Invention

This invention relates to a process for plugging porous earth formations. More particularly this invention relates to plugging an underground formation penetrated by a well bore, by pumping a shear-thickening fluid down the well bore to the site of the formation desired to be plugged and subjecting the shear-thickening fluid to high shear which instantly forms a stiff paste to plug said formation, wherein said process is characterized in that the water-in-oil emulsion portion of the shear-thickening fluid is used as a spacer to separate said fluid from drilling mud while same is pumped down the well bore.

2. Background of the Disclosure

During the drilling and production of wells, such as oil, gas or water wells, various problems sometimes occur which, if not corrected, result in the loss of considerable well production and even loss of the well itself. These problems include blow-outs, lost circulation and channeling. Blow-outs occur when the drill bit cuts into a high pressure zone of gas, oil, or water which can blow out the drilling mud and sometimes even the drill stem, bit and surface equipment resulting in their loss and destruction also. Lost circulation of drilling mud occurs when the drill bit cuts through a porous formation at a pressure such that drilling mud coming down the drill stem flows into the porous structure instead of being forced back up to the surface between the drill stem and well casing. Channeling occurs when a fluid in one porous formation flows through continuous passages in cement behind well casing into another porous formation at a different depth in the well.

A number of methods and compositions have been employed in order to solve these problems, none of which has met with complete success and, in fact, most have not been too successful. One method of trying to stop blow-outs involves loading up the well with a slurry of barite under pressure and under conditions such that the barite is able to settle uniformly at the bottom of the well to form a hard plug which may then be followed up with a cement slurry in order to make the plug more or less permanent. Various methods employed to stop lost circulation include slurries of barite along with fiberous, lumpy or flakey materials which it is hoped will ultimately form a filter cake and then a mat over the porous formation and thus plug up the channels. Another method used is to employ what is known as gunk which is a slurry of dry, powdered bentonite in diesel oil. When this material is mixed with the right amount of water, the bentonite will hydrate yielding a stiff paste. If formed at the right time and at the right place, this sometimes works as an effective lost circulation and well-plugging material. This type of material and method for its use is disclosed, for example, in U.S. Pat. No. 3,082,823. However, there are many problems associated with the use of this gunk. Among these problems is that the slurry must be kept dry until it reaches the desired formation in the well bore at which time it must be mixed with the proper amount of water in order to form a paste and not an emulsion or a slurry of hydrated benetonite.

U.S. Pat. No. 3,448,800 discloses a plugging method for restoring lost circulation in a well wherein a suspension or slurry of a particulate, water-soluble polymer in a non-aqueous medium is injected into a well. An aqueous slurry of a mineral material such as cement, barite or plaster of paris is separately injected into the well, with the two slurries meeting and mixing at the bottom of the well bore to form a plug at the area of lost circulation. U.S. Pat. No. 2,836,555 discloses a well plugging composition for restoring lost circulation in wells which comprises compressed, dehydrated pellets of bentonite encapsulated within a solid, water-insoluble polymeric coating which has a tiny hole drilled through the surface thereof. These pellets are pumped down into the well bore and, as they do so, water seeps into the hole in the coating into the bentonite thereby swelling and ultimately rupturing the coating. By proper design of the coating, etc., it is postulated that the pellets will rupture after they have become lodged in the lost circulation area to form a tight seal. U.S. Pat. No. 2,890,169 discloses another well control or lost circulation fluid which is made by forming a slurry of an organophilic bentonite and cement in oil. This slurry is mixed with a surfactant and water to form a composition comprising a water-in-oil emulsion having organophilic bentonite and cement dispersed in the continuous oil phase. As this composition is pumped down the well bore, the oil expands and flocculates the bentonite which, under the right conditions, forms a filter cake on the well bore surface in the porous area. This is then supposed to cause a filtration action which breaks the emulsion causing the emulsified water to react with the cement to form a solid coating on the filter cake thereby plugging the porous area.

One of the problems encountered with the use of organophilic clays, such as bentonite clays treated with quaternary ammonium compounds having at least one alkyl, alkylene or alkylidine radical, is that oil rapidly expands and disperses the clay at low shear rates. These organic modified clays are prepared from bentonite-type clays that are normally hydrophilic in nature. A typical organic modified clay is dimethyldihydrogenated tallow ammonium bentonite. These clays are used mainly as oil viscosifiers and dispersion aids and are not used as the plugging component of well control fluids.

It is known to those in the art that if one can mix a hydrophilic or water expandable clay, such as bentonite, with the proper amount of water in the presence of a water-soluble polymer which will flocculate and congeal the clay, a much stronger and stiffer paste can be made than that which will occur if the bentonite is merely mixed with water. Thus, U.S. Pat. No. 3,909,421 discloses a high viscosity fluid useful in secondary oil recovery processes. This fluid is made by physically blending a dry powdered, polyacrylamide with bentonite followed by mixing the powder blend with water. U.S. Pat. No. 4,128,528 claims a powdered bentonite-polyacrylamide thickening composition prepared by mixing a water-in-oil emulsion with bentonite to form a damp, free-flowing powdered composition which rapidly forms a viscous, stiff material when mixed with water. The dispersed aqueous phase of the emulsion contains a water soluble surfactant along with a dispersion and/or solution of a water soluble polymer formed in-situ in the emulsion. The water-soluble polymer may be polyacrylamide or a copolymer of acrylamide and acrylic or methacrylic acid. This composition is taught as being useful for drilling muds, bases for earthen dams and clay cements.

Although many efforts have been made in an attempt to use bentonite-water systems with or without a water-soluble polymer which will flocculate and congeal the bentonite, one of the main problems has been to keep the bentonite away from the water until same reaches the desired part of the well bore, which is usually at the bottom. Another problem has been making sure that the bentonite mixes with the proper amount of water to rapidly form a stiff paste or cement at the location of the problem in the well.

An attempt to overcome these difficulties has been made by dispersing bentonite into the continuous, oily phase of a water-in-oil emulsion formulated to have a proper balance of water and bentonite and also formulated to keep the bentonite and water apart until the dispersion is forced through the nozzles of the drill bit at the bottom of the well. Thus, copending application Ser. Nos. 79,436 (abandoned) and 79,437 (abandoned) filed on Sept. 27, 1979 and Ser. No. 79,978 (abandoned) filed on Sept. 28, 1979 disclose shear thickening well control fluids which comprise bentonite dispersed in the continuous, oily phase of a water-in-oil emulsion. The oily phase contains a surfactant and the dispersed, aqueous phase may or may not contain a water-soluble polymer, such as a polyacrylamide, for congealing and flocculating the clay. These well control fluids have met with some success in solving some of the problems discussed above. However, it has recently been discovered that drilling mud, oil or water directly contacting the shear thickening fluid in the drill pipe has an adverse effect on the paste that is ultimately formed from the shear thickening fluid itself.

SUMMARY OF THE INVENTION

It has now been found that drilling mud, water, oil, etc. can be used to displace a shear thickening well control fluid down a drill pipe without adversely affecting said fluid if the water-in-oil emulsion portion of the shear thickening fluid is used as a spacer between said fluid and the displacing fluid. Thus, the present invention relates to a process for plugging an underground formation penetrated by a well bore by using a shear thickening fluid comprising a water-in-oil emulsion having particles of hydratable, water expandable clay dispersed in the continuous oily phase thereof wherein said process comprises pumping said shear thickening fluid down through a conduit in said formation to the portion thereof desired to be plugged at which point said fluid is subject to conditions of shear sufficient to form a paste which plugs said porous formation, wherein said shear thickening fluid in said conduit is both preceded and followed by a displacing fluid and wherein the shear thickening fluid in said conduit is separated from said displacing fluid by a spacer fluid which comprises a water-in-oil emulsion whose composition is similar to the water-in-oil emulsion part of said shear thickening fluid.

In use, the shear thickening fluid is pumped down into drill pipe extending down into the well bore and is both preceded and followed by another fluid. In the case where an oil or gas well is in the process of being drilled, relieved or extended, drilling mud will be circulated through the drill pipe, in which case the shear thickening fluid will be both preceded and followed by drilling mud. In the case of a producing well, the shear thickening fluid would normally be pumped down into the well using water or an oil such as diesel oil as the displacing fluid.

It has been found that drilling mud has an adverse effect on the shear thickening fluid in the drill pipe by greatly reducing its low shear thickening time. This can result in forming a paste in the drill pipe itself and not in the well bore. If the shear thickening fluid contacts water, the water tends to be emusified into the water-in-oil emulsion portion of the shear thickening fluid which results in both a decrease in the low shear thickening time and a decrease in the shear strength of the paste ultimately formed. If the shear thickening fluid is in contact with an oil, such as diesel or other oil, the low shear thickening time is not reduced and in fact is extended. However, because the oil tends to mix with and dilute the continuous oily phase of the shear thickening fluid, the shear strength of the paste ultimately formed by forcing the fluid through the nozzle of the drill bit is greatly reduced. These adverse effects are greatly reduced using the process of this invention.

DETAILED DESCRIPTION

By shear thickening fluid or composition is meant that the application of shear to said composition will result in the formation of a sticky, rubber-like paste or solid, whose strength and integrity is a function of the intensity and duration of the shear forces employed as well as the particular formulation utilized. The greater the shear rate the faster the paste is formed and the stronger it will be. It should be noted that the water-in-oil emulsion portion of the composition useful in this invention of itself is extremely stable with a shelf life upwards of two or more years. However, when the clay is mixed or dispersed into the emulsion it slowly starts to adsorb water. Thus, if one mixes or disperses the clay into the emulsion very gently, using relatively low shear forces and then allows the so-formed composition useful in the process of this invention to remain undisturbed, the clay will settle out on the bottom and slowly start to adsorb water and ultimately congeal. If sufficient time has elapsed and the settled clay starts to congeal, the shear force required to redisperse the clay will rapidly form a paste. Thus, it is preferred to use the composition useful in the process of this invention as soon as possible after preparing same.

One can thus understand that the term "shear thickening" is a term of art and is difficult to quantify with precision. If one intends to use the process of this invention for well control, one may use low shear devices such as those normally used for mixing cement at a well site (i.e., for cementing behind well casing) to form the shear-thickening composition useful in this invention. Illustrative, but non-limiting examples of such devices include Halliburton ribbon or turbine blenders and cement mixers. After the shear thickening composition has been formed, it will be pumped down the drill pipe at a rate broadly ranging from about 0.1 to 10 barrels per minute (bpm) wherein it will be subject to relatively low shear rates broadly ranging from less than about 1 to about 1,000 sec.$^{-1}$. Even under these conditions the viscosity of the composition slowly rises as the clay adsorbs water and slowly hydrates. However, some prehydration is desirable, because, all other things being equal, it will result in a stronger paste formed by the subsequent high shear forces through the holes in the drill bit.

When the composition useful in the process of this invention is finally pumped through the holes or nozzles of the drill bit, it is subjected to high shear rates broadly ranging from about 2,000 to 1,000,000 sec.$^{-1}$, preferably 10,000 to 1,000,000 sec.$^{-1}$, which instantly forms a sticky, rubbery paste. The shear strength of this paste, as measured by the laboratory method set forth in the following two paragraphs, will be in excess of at least about 1,000 lbs/100 ft.$^2$, preferably 2,000 lbs/100 ft.$^2$ and still more preferably in excess of 3,000 lbs/100 ft.$^2$. The shear strength of the paste formed from the shear thickening fluid or composition is expressed in pounds per 100 ft.$^2$ as opposed to pounds per ft.$^2$, because 100 ft.$^2$ roughly corresponds to the internal area of a 90 ft. string of drill pipe having an inside diameter of about 4 inches.

In the laboratory, this shear strength may be determined by forming about 500 ml of the shear thickening fluid and then stirring the shear thickening fluid with an egg beater impeller, at a speed of about 500 rpm and a temperature of 120° F., until it starts to gel. After the composition starts to gel, it is then placed in a high shear test cylinder containing a floating piston with a one quarter inch ball valve opening at one end and the other end capable of being pressurized by nitrogen at about 1500 psi. Thus, the 500 ml sample is placed in the high shear piston cell in front of the floating piston. The cell is then sealed and pressurized with nitrogen at about 1500 psi behind the piston. After the chamber is pressurized, the ball valve is opened and the 500 ml sample is forced through the one quarter inch opening in considerably less than one second which forms a stiff paste substantially instantaneously.

The shear strength of the so-formed paste is measured by noting the distance that a hollow, aluminum cylinder 3.5 inches long × 1.4 inches wide with a wall thickness of 0.06 inches sinks into the paste under the force of various weights after a period of 20 seconds. The shear strength is then calculated from the following expression:

$$\text{Shear strength, Lb/100 ft.}^2 = 3.6 \times \frac{\text{Total wt., grams}}{\text{Penetration distance, inches}}$$

The water-in-oil emulsion used as the spacer for the shear thickening fluid employed in the process of this invention will, in general, comprise the same type of emulsion used in the shear thickening fluid. From a practical point of view and as a matter of convenience, the emulsion used for the spacer will be identical to the emulsion used in the shear thickening fluid, inasmuch as the clay must be added to the water-in-oil emulsion portion of the shear thickening fluid at the well site. It should be understood, of course, that the emulsion used for the spacer need not be identical in every respect to the emulsion employed for the shear thickening fluid and that there may be differences in the ratios of components to each other as well as in the additives employed in both the emulsion spacer and in the emulsion part of the shear thickening fluid.

The continuous, oily phase of the emulsion will be a liquid which is immiscible with water and with the interior aqueous phase of the emulsion. In general, this will comprise any oil or hydrocarbon liquid, typically a mineral oil. Illustrative, but not-limiting examples of oily liquids that have been tried and found to work as the oily phase include paraffinic hydrocarbons such as Low Odor Paraffin Solvent (LOPS) and Solvent 100 Neutral (S-100N) available from the Exxon Chemical Company and Exxon Company U.S.A., respectively, as well as paraffinic base oils having an appreciable aromatic content such as Mentor 28 and Mentor 32 which are available from the Exxon Company U.S.A. Further, kerosene and diesel fuel will also work, but not as well as the others. That is, the use of kerosene and diesel fuel will result in a reduction of the low shear thickening time and pumpability of the shear thickening fluid and result in a weaker paste. Further, it should be emphasized again that the exact nature of the oil is not critical as long as it is not miscible with water or with the aqueous internal phase of the emulsion and does not react with the clay or any of the other components of the composition.

The continuous, oily, water immiscible phase of the emulsion must contain one or more oil soluble surfactants for forming and stabilizng the emulsion. Not all surfactants work in the shear thickening composition of this invention. Oil soluble surfactants that have been found to be particularly useful in the composition of this invention comprise polyamine derivative surfactants, particularly alkylene polyamine derivatives of polyalkenyl succinic anhydrides. These materials are known to those skilled in the art and are taught, for example, in U.S. Pat. No. 3,172,892, the disclosures of which are incorporated herein by reference. Also useful are borated and carboxylated derivatives of these materials such as those disclosed in U.S. Pat. No. 4,173,540 and British Pat. No. 1,018,982, respectively, the disclosures of which are also incorporated herein by reference.

The polyalkenyl succinic anhydrides useful in preparing these surfactants will generally comprise those wherein the polyalkenyl group has a $M_n$, number average molecular weight, of about 700 to 5,000, preferably 900 to 2,000. The methods of preparation are well known in the art, i.e., reaction of maleic anhydride with either the polyolefin itself or with a chlorinated polyolefin which in either case provides the desired polyalkenyl succinic anhydride. Polyisobutylene is preferred but other polymers of $C_3$ or $C_4$ olefins such as polybutene-1 and polypropylene are suitable, including mixtures of such polyolefins. Polyisobutylene succinic anhydride is referred herein as PIBSA.

Preferred alkylene polyamines are also well known and are represented by the formula $NH_2(CH_2)_n(NH(CH_2)_n)_mNH_2$, wherein n is 2 to 3 and m is 0 to 10. Illustrative are ethylene diamine, diethylene triamine, triethylene tetramine, tetraethylene pentamine, pentaethylene hexamine, and the like.

As hereinbefore stated, clays useful in the shear thickening compositions of this invention are hydrophilic, water-swellable clays. This includes those clays which are well-known to those skilled in the art as useful in well drilling and well control operations. Particularly preferred are montmorillonite and bentonite clays. Species of these clays include beidellite, nontronite, hectorite, and saponite. As a practical matter, cost considerations may dictate that the clays used in this invention will be the sodium montmorillonite or bentonite clays. A commercially available clay that has been found to be useful in this invention is KWK Volclay available from the American Colloid Company. This clay is 90% montmorillonite with about 70-75% of the montmorillonite in the sodium form. Granular clay is preferred to powdered clay. It has been found that the larger the clay particle size used in the shear thickening composition useful in the process of this invention, the longer will be the low shear thickening time and the more clay can be used at a given viscosity without adversely effecting the strength of the paste. In well control processes, the upper limit of the clay particle size will be limited to that which can pass through the holes in the drill bit. For most applications, it will be preferred to use granular clay having a mean particle size below about 60 Tyler mesh, and preferably below about 40 mesh. If this invention is to be used for well control purposes, then granular clay should be used and preferably granular clay that has had fines removed. Hydrophobic clays, such as those made by reacting bentonite with one or more long chain hydrocarbon quaternary ammonia compounds, are not included in the scope of this invention.

In many instances it may be preferable for the aqueous phase of the emulsion used for the shear thickening fluid and/or the spacer in the process of this invention to contain one or more water soluble polymers for flocculating and congealing the hydrated bentonite when the emulsion is broken and the aqueous phase contacts the bentonite dispersed in the oily phase. Illustrative, but not-limiting examples of suitable polymers include polyacrylamide and polyethylene oxide. Polyacrylamides are preferred, preferably nonionic or unhydrolyzed polyacrylamides. The molecular weight of the polyacrylamide should be greater than about one million. It has been found that higher molecular weight polyacrylamides impart a more rubbery, elastomeric character to the pastes formed by subjecting the compositions of this invention to relatively high shear. That is, the higher the molecular weight of the water soluble polyacrylamide used in the invention, the greater will be both the shear strength and integrity of the so-formed paste, even in the presence of flowing fluids, such as gas, oil, brine, water etc.

The exact amounts of the various components of the shear-thickening composition useful in the process of this invention will vary somewhat depending upon the nature and molecular weight of the amine derivative surfactant, polyacrylamide and oil-soluble amine. The following table, based on 100 parts by weight of 10–60 mesh (Tyler) granular KWK clay, illustrates the general and preferred ranges of the various ingredients to each other of the shear thickening composition of this invention.

|  | Parts by Weight | |
| --- | --- | --- |
|  | General | Preferred |
| granular clay, 10–60 mesh | 100 | 100 |
| water | 25–400 | 100–300 |
| water soluble polymer | 0–10 | 0.1–7 |
| oil | 25–130 | 50–100 |
| surfactant | 5–40 | 15–25 |

The amounts of the various components of the clay-free emulsion used as the spacer in the process of this invention will also vary somewhat depending upon the particular formulation used and any additives which may be included. The following table, which is similar to the table above, illustrates the general and preferred ranges of the various ingredients to each other of this emulsion spacer.

|  | Parts by Weight | |
| --- | --- | --- |
|  | General | Preferred |
| water | 25–400 | 100–300 |
| water soluble polymer | 0–10 | 0–1.7 |
| oil | 25–130 | 50–100 |

-continued

|  | Parts by Weight | |
| --- | --- | --- |
|  | General | Preferred |
| surfactant | 5–40 | 15–25 |

A unique feature of using the emulsion as a spacer between the shear-thickening fluid and drilling mud or water or oil, etc., is that its viscosity can be controlled as a function of its composition and also its shear history or the type and extent of mixing employed to make the emulsion. The viscosity of the spacer is important in the process of this invention, because it has been found that the viscosity of the spacer preceding the shear-thickening fluid down the drill pipe should be intermediate between the viscosity of both the shear thickening fluid and the fluid preceding the spacer in order to minimize fingering of the fluids into each other during flow down the pipe. If the viscosity of the spacer is greater than that of the shear-thickening fluid, then one runs the risk of fingering of the shear-thickening fluid into the spacer which will result in formation of a paste of greatly reduced strength, the exact reduction depending upon how much the shear-thickening fluid has intermingled with and been diluted by the spacer. On the other hand, if the viscosity of the spacer is less than that of the drilling mud or water preceding it down the pipe, then the spacer will finger into and mix with the drilling mud or water. If the spacer becomes contaminated with drilling mud, then one runs the risk of paste formation in the pipe or greatly reduced low shear-thickening time. If the spacer becomes contaminated with too much water or oil, then the paste subsequently formed by shearing the shear-thickening fluid through the drill bit will have less strength.

By way of illustration, the viscosity of a typical shear-thickening well control fluid at a shear rate of 1,000 sec.$^{-1}$ will be about 10 poise. On the other hand, at the same shear rate drilling mud has a viscosity of about 0.5 poise while water alone has a viscosity of 0.01 poise. The clay-free, water-in-oil emulsion portion of such a typical shear-thickening fluid, which will comprise a 2/1 weight ratio of water to oil and wherein the oil contains about 25 wt.% of polyamine derivative surfactant, can have a viscosity of from about 5 to 100 or more, depending upon the amount of shear used to prepare the emulsion. On the other hand, if one is using a pre-prepared emulsion, then it is rather easy to increase the viscosity thereof by subjecting the same to additional shear. Conversely, diluting the same emulsion with additional oil will result in a decrease of viscosity. It should also be understood that varying the ratio of the aqueous and oily phases to each other, as well as varying the concentration of surfactant in the oily phase will also greatly alter the viscosity, all other things being equal. Thus, the viscosity range of the emulsion spacer may, if desired, range from less than 5 or so to values substantially in excess of 100.

If desired, the aqueous phase of both the shear thickening composition and the emulsion shear used in the process of this invention may contain various additives such as one or more low molecular weight alcohols or glycols as antifreezes to prevent the aqueous phase of the emulsion from freezing at low temperatures. This may be particularly desirable if one intends to use the composition of this invention in cold weather. Any of the commonly used antifreezes may be employed in the aqueous phase of the composition of this invention such as methanol, isopropanol, ethylene glycol, propylene glycol, etc. When an antifreeze is employed in the aqueous phase of this emulsion, it will generally be employed in said aqueous phase in an amount broadly ranging from about 10 to 35 wt. % thereof. In some cases, it may also be advantageous for the aqueous phase of the emulsion spacer to contain one or more salts such as potassium or sodium chloride to retard swelling of the hydratable clay in the shear-thickening fluid at the interface of the shear-thickening fluid and emulsion spacer.

DESCRIPTION OF A PREFERRED EMBODIMENT

In a hypothetical, but typical well plugging operation, 100 pounds of American Cyanamid P-250 polyacrylamide will be dissolved into 32 barrels (about 11,200 lbs.) of fresh water using a mixing tank equipped with a recirculating centrifugal pump. The pump will be equipped with a jet hopper on the outlet side. The polyacrylamide powder will be slowly fed into the hopper and mixed with and into the water being circulated by the pump. In a separate tank, three drums (about 1,314 lbs) of a PIBSA-polyamine derivative surfactant will be dissolved into ten drums (about 3900 lbs) of an oil such as Mentor 28. This oil tank will preferably be equipped with a positive displacement pump having a tee inlet. After the surfactant has been dissolved in the oil, the oily surfactant solution will be circulated through the positive displacement pump. An oil external emulsion or water-in-oil emulsion will then be formed by adding the aqueous polymer solution to the recirculating oil through the tee inlet of the positive displacement pump. The rate of addition of polymer water to the oil will be one volume of aqueous polymer solution added for each three volumes of oily surfactant solution or recirculated emulsion. After all of the polymer solution has been added to and emulsified in the oil, the resulting emulsion will be circulated through the positive displacement pump for about thirty minutes to insure complete emulsification of the aqueous phase into the oily phase. This emulsion may, if convenient, be made off-site in advance, stored and then trucked to the well site when needed.

Immediately prior to use at the well site, about eight barrels of the emulsion prepared above will be set aside for use as front and back spacers for the shear-thickening fluid. The rest of the emulsion will be placed into a Halliburton ribbon blender. In the Halliburton ribbon blender, 52 sacks (5600 lbs.) of 20-40 Tyler mesh KWK Volclay will be dispersed into the continuous oily phase of the emulsion. While this clay is being dispersed into the continuous oily phase of the emulsion about 10 barrels of water flush will be pumped into the drill pipe in the well bore, the drill pipe containing circulating drilling mud. This water flush will be followed by four barrels of the emulsion spacer and then by the approximately 47 barrels of the shear thickening fluid formed in the Halliburton ribbon blender. The shear thickening fluid will be pumped down into the drill pipe at a rate of about one barrel per minute using a Halliburton pump truck containing a triplex pump. The shear thickening fluid will be followed with four barrels of emulsion as a spacer, with the emulsion spacer followed by drilling mud. Drilling mud will then be used to displace or push the shear thickening fluid through the drill pipe to the zone desired to be plugged in the well bore. The drilling mud will be pumped into the drill pipe at a rate of about three barrels per minute. When the shear thickening fluid reaches the drill bit, the drilling mud will then be pumped into the drill pipe at a rate of about six barrels per minute so that the shear thickening fluid is sheared through the drill bit nozzles at a rate of about six barrels per minute.

The invention will be further understood by reference to the example below.

EXAMPLE

This example was an actual field test performed on a well in the continental United States. In this well, a lost circlation zone occurred below about 5500 feet. Four attempts to alleviate this problem were made employing standard types of lost circulation mud which comprised a slurry of fiber and paper in gelled mud. None of these attempts at stopping the lost circulation was successful. The well was then dry drilled to about 6500 feet and the drill pipe pulled back to about 5900 feet which was roughly 100 feet above the lost circulation zone.

A shear-thickening fluid having the following composition was prepared using the procedure outlined in the DESCRIPTION OF A PREFERRED EMBODIMENT set forth on pages 15 and 16 herein.

|  | parts by weight |
|---|---|
| Water | 164 |
| Polymer | 1.8 |
| Oil | 63 |
| Surfactant | 22 |
| Clay | 100 |

The polymer was American Cyanamid's P-250 polyacrylamide, the oil used was Mentor 28 from Exxon Company U.S.A., the surfactant was a borated derivative of the reaction product of polyisobutylene which was prepared by condensing 2.1 moles of polyisobutenyl succinic anhydride having a Saponification Number of 112 and a number average molecular wt. ($M_n$) of about 900 dissolved in a neutral mineral oil to provide a 50 weight percent solution, with one mole of said alkylene polyamine. The procedure used to prepare this surfactant was the same procedure used in Example 2 of U.S. Pat. No. 4,173,540, the disclosures of which have already been incorporated herein by reference. The clay was a 20-40 Tyler mesh KWK clay obtained from the American Colloid Company.

After the emulsion was prepared, ten barrels of the emulsion were set aside for use as spacers and transferred to a tank on a pump truck. Ninety sacks (9600 lbs.) of the clay were added to the rest of the emulsion in a Halliburton ribbon blender to form the 85 barrels of the shear-thickening fluid. After the shear-thickening fluid was prepared, ten barrels of water were pumped into the drill pipe to insure that the pump lines and drill pipe were not plugged and to clean the lines. The ten barrel water flush was followed by four barrels of the emulsion spacer, followed by 85 barrels of the shear-thickening fluid, which was then followed by six barrels of emulsion spacer. It should be noted that there was drilling mud in the pipe prior to the introduction of the water flush, emulsion spacer and shear-thickening fluid.

The shear-thickening fluid and emulsion spacers were pumped into the drill pipe using a triplex pump. After the water flush, the emulsion spacers and shear-thickening fluid were pumped into the drill pipe of a rate of about 2 barrels per minute. The inside diameter of the drill pipe was about 3½ inches inasmuch as it was 4½ inch drill pipe. The shear-thickening fluid and spacers were then displaced or pushed down through the drill pipe with drilling mud which was pumped at a rate of about 3 to 5 barrels per minute. The pumping rate was slowly increased during pumping of the drilling mud displacing fluid in order to maintain a pump pressure of 1200 psi. The shear-thickening fluid was pumped out through a drill bit having three nozzles of 11/32 inches inside diameter each to form the paste and plug the zone of lost circulation.

After all the shear-thickening fluid had been pumped through the drill bit the pump was stopped for a period of two hours. After this, drilling mud was again pumped down into the well and it was found that the formation held 50 psi when the drilling mud was pumped at a rate of ¼ bpm and more than 250 psi when the rate increased to 2 bpm. This was a good indication that the lost circulation zone had been plugged. After reestablishing circulation, normal drilling was resumed.

In another test, a similar shear-thickening fluid, emulsion spacer and procedure was used to seal off unwanted gas flow in a well that was being drilling in the continental United States. In this well, previous attempts at plugging the gas flow using a 1000 foot cement plug and a 100 barrel, 16 pound per gallon barite plug had failed to stop the gas flow.

What is claimed is:

1. A process for plugging an underground formation penetrated by a well which comprises using a displacing fluid to transport a shear thickening fluid to said formation, under conditions of relatively low shear, through a conduit extending into said well and then subjecting the shear thickening fluid to conditions of relatively high shear at that point of the formation desired to be plugged to form a paste which plugs said formation, wherein said shear thickening fluid comprises a water-in-oil emulsion having particles of hydratable, water-expandable clay dispersed in the continuous oily phase thereof, said oily phase having a surfactant dissolved therein and wherein said shear thickening fluid is both preceded and followed by a liquid spacer as it proceeds through said conduit, said spacer comprising a water-in-oil emulsion having a surfactant dissolved in the continuous oily phase thereof and having a viscosity less than the viscosity of the shear thickening fluid, but greater than that of the displacing fluid.

2. The process of claim 1 wherein said low shear conditions comprise shear rates of less than about 1000 sec.$^{-1}$.

3. The process of claim 2 wherein said high shear conditions comprise shear rates of at least about 10,000 sec.$^{-1}$.

4. The process of claim 3 wherein said shear thickening fluid comprises, on a parts by weight basis, 100 parts of clay, from about 25 to 400 parts of water, from about 25 to 130 parts of oil and from about 5 to 40 parts of surfactant.

5. The process of claim 4 wherein said emulsion spacer comprises, on a parts by weight basis, from about 25 to 400 parts of water, from about 25 to 130 parts of oil and from about 5 to 40 parts of surfactant.

6. The process of claim 5 wherein said hydratable, water-expandable clay is granular.

7. The process of claim 6 wherein the composition of said emulsion spacer is similar to the emulsion portion of said shear thickening fluid.

8. The process of claim 7 wherein the surfactant in the oily phase of both the shear thickening fluid and the spacer comprises an amine derivative surfactant.

9. The process of claim 6 wherein said clay comprises a bentonite clay.

10. The process of claim 9 wherein the oily phase of both the shear thickening fluid and the spacer comprises a hydrocarbon liquid.

11. The process of claim 7 wherein said surfactant comprises a polyamine derivative of a polyalkenyl succinic anhydride.

12. The process of claim 10 wherein said aqueous phase of the emulsion portion of the shear thickening fluid contains at least one water soluble polymer for flocculating and congealing said clay when said aqueous phase and clay are mixed under said conditions of high shear to form said paste.

13. The process of either of claims 10 or 11 wherein said granular clay has an average particle size below about 60 Tyler mesh.

14. The process of claim 12 wherein said surfactant comprises an alkylene polyamine derivative of a polyisobutylene succinic anhydride.

15. A process for plugging a portion of a well bore using a shear-thickening composition which comprises a water-in-oil emulsion having particles of hydratable, water expandable clay dispersed in the continuous oily phase thereof, said oily phase comprising a hydrocarbon liquid having a surfactant dissolved therein wherein said process comprises pumping said shear thickening composition down through a conduit in said well to that part of said well bore it is desired to plug at which point said composition is subjected to high shear conditions sufficient to form a paste which plugs said well bore wherein said shear-thickening fluid is both preceded and followed by a liquid spacer which separates the shear thickening fluid from a displacing fluid or drilling mud as the shear thickening fluid proceeds down through said conduit in said well bore, said spacer comprising a water-in-oil emulsion wherein the continuous oily phase comprises a hydrocarbon liquid having an amine derivative surfactant dissolved therein and wherein the viscosity of said spacer is less than the viscosity of the shear thickening fluid but greater than the viscosity of the displacing fluid or mud.

16. The process of claim 15 wherein said shear thickening composition comprises, on a parts by weight basis, 100 parts of clay, from about 25 to 400 parts of water, from about 25 to 130 parts of oil and from about 5 to 40 parts of surfactant.

17. The process of claim 16 wherein said hydratable water expandable clay is granular.

18. The process of claim 17 wherein said clay comprises bentonite.

19. The process of claim 15 wherein said water-in-oil emulsion spacer comprises, on a parts by weight basis, from about 25 to 400 parts of water, from about 25 to 130 parts of oil and from about 5 to about 40 parts of surfactant.

20. The process of claim 19 wherein said surfactant dissolved in the oily phase of both the shear thickening fluid and the spacer comprises a polyamine derivative surfactant.

21. The process of claim 20 wherein said aqueous phase of said emulsion portion of said shear thickening fluid contains at least one water soluble polymer for flocculating and congealing said clay when said aqueous phase and clay are mixed under said conditions of high shear to form said paste.

22. The process of either of claims 18 or 21 wherein said granular clay has an average particle size range of from between about 10–60 Tyler mesh.

23. The process of claim 22 wherein the composition of the spacer is similar to the composition of the emulsion portion of the shear thickening fluid.

24. The process of claim 23 wherein said displacing fluid comprises drilling mud.

25. The process of claim 21 wherein said surfactant comprises a polyamine derivative of a polyalkenyl succinic anhydride.

26. The process of claim 25 wherein shear rates employed to form said paste broadly range from between about 2,000 to about 1,000,000 sec.$^{-1}$.

27. The process of claim 26 wherein said surfactant comprises an alkylene polyamine derivative of PIBSA.

28. A process for plugging a portion of a well bore using a shear thickening composition, a displacing fluid and an emulsion spacer having a viscosity less than that of the shear thickening composition, but greater than that of the displacing fluid, wherein a conduit which contains displacing fluid extends down into the well bore from the surface thereof to that portion of the well bore desired to be plugged, wherein said shear thickening composition comprises a water-in-oil emulsion having particles of hydratable, water expandable clay dispersed in the continuous oily phase thereof, said oily phase comprising a hydrocarbon liquid having a surfactant dissolved therein and wherein said spacer comprises a water-in-oil emulsion wherein the continuous oily phase thereof comprises a hydrocarbon liquid having a surfactant dissolved therein, said process comprising the steps of:

(a) positioning the bottom of said conduit to the location of said well bore desired to be plugged;

(b) pumping a first portion of said spacer emulsion into said fluid containing conduit;

(c) pumping said shear thickening composition into said conduit so that said shear thickening composition contacts said spacer emulsion in said conduit;

(d) pumping a second portion of said spacer emulsion into said conduit so that it contacts said shear thickening composition;

(e) pumping a displacing fluid into said conduit so that it contacts said second portion of said spacer emulsion and displaces said shear thickening composition at a relatively low shear rate to the bottom of said conduit;

(f) increasing the pumping rate of said displacing fluid into said conduit to force said shear thickening composition out of said conduit under conditions of shear of at least about 2,000 sec$^{-1}$ to form a paste and plug said well bore.

* * * * *